Jan. 13, 1959     W. A. KIRK ET AL     2,868,253
SHEAR BAR MOUNTING MEANS TO PROVIDE A CURVED CUTTING EDGE
Filed July 5, 1956     2 Sheets-Sheet 1
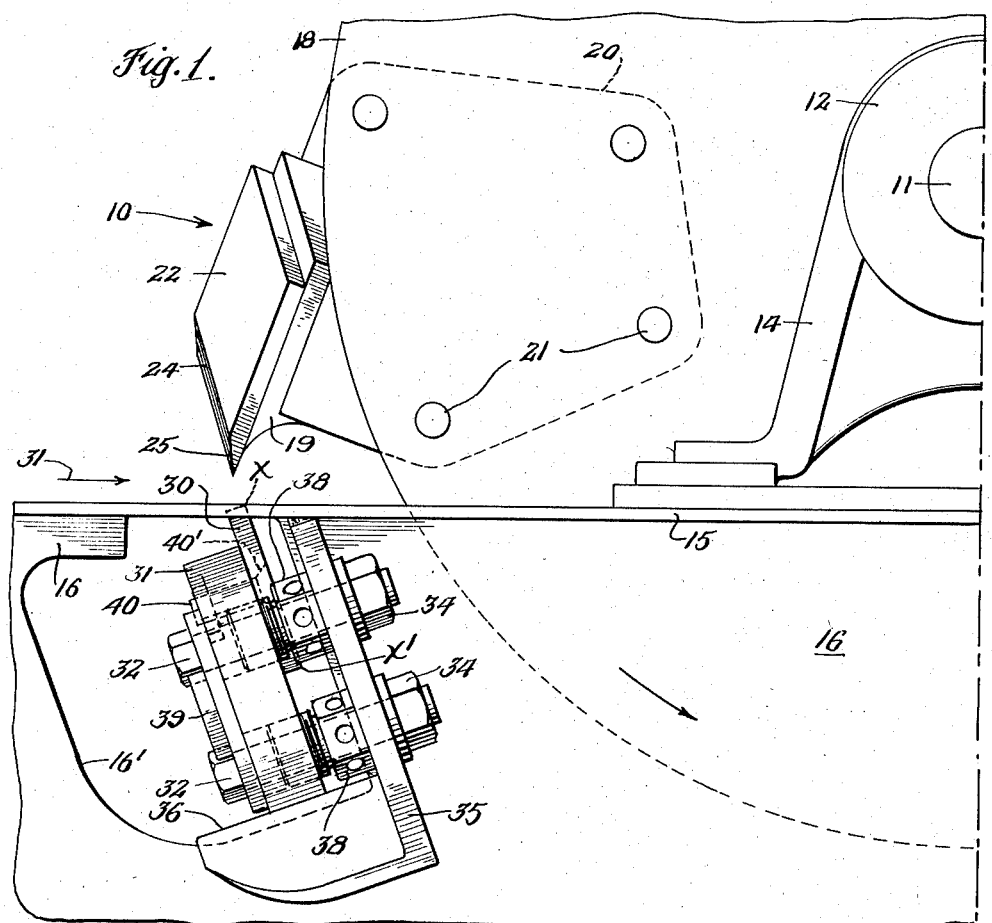
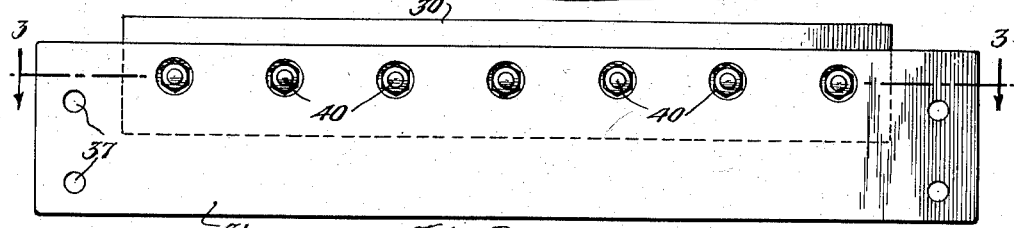
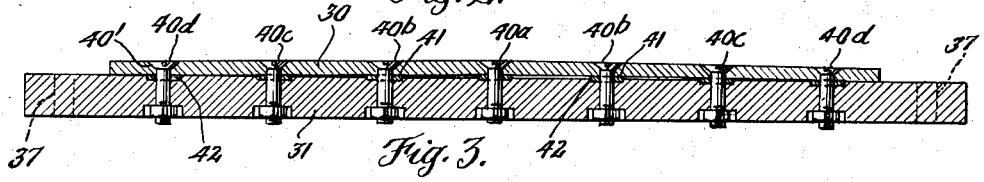
INVENTORS
William A. Kirk
&
Joseph A. Brown Jan. 13, 1959     W. A. KIRK ET AL     2,868,253
SHEAR BAR MOUNTING MEANS TO PROVIDE A CURVED CUTTING EDGE
Filed July 5, 1956     2 Sheets-Sheet 2
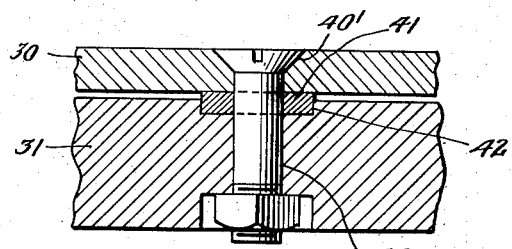
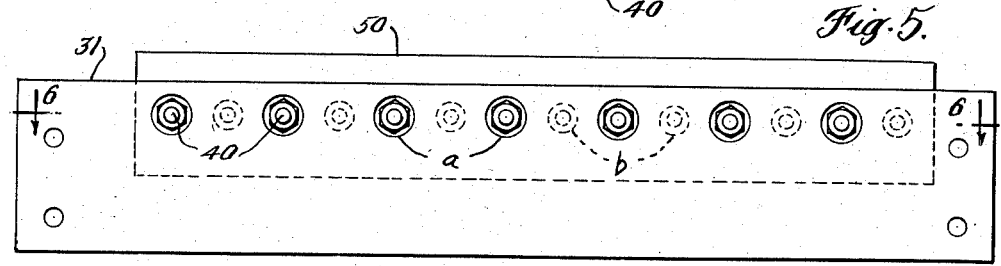
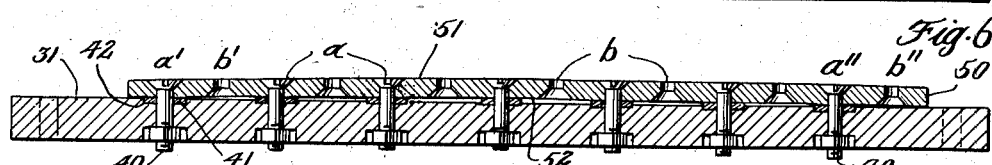
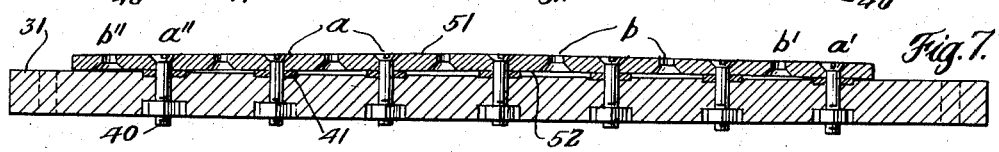
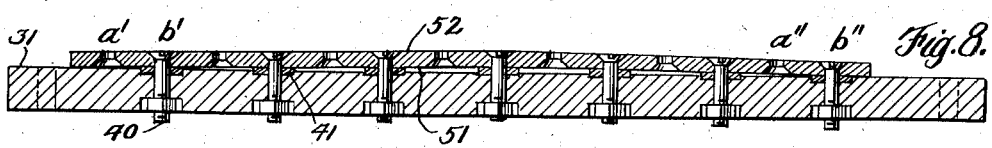
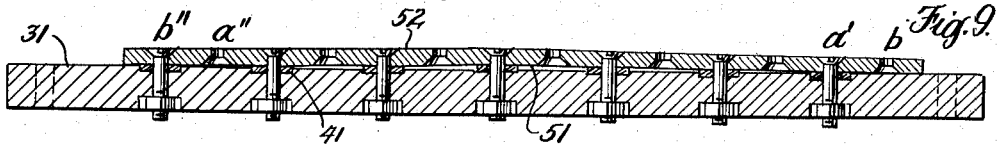
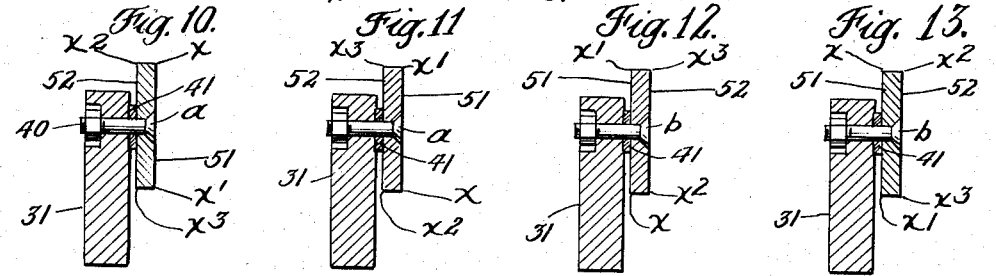
INVENTORS
William A. Kirk
&
Joseph A. Brown United States Patent Office 2,868,253
Patented Jan. 13, 1959

2,868,253

SHEAR BAR MOUNTING MEANS TO PROVIDE A CURVED CUTTING EDGE

William A. Kirk and Joseph A. Brown, Lancaster, Pa., assignors to Sperry Rand Corporation, New Holland, Pa., a corporation of Delaware Application July 5, 1956, Serial No. 595,875

6 Claims. (Cl. 146—117)

The present invention relates generally to reel type cutting or chopping mechanisms. More particularly, the invention relates to improved means for mounting a stationary knife or shear bar in a reel type chopping mechanism such as that shown and described in U. S. Patent 2,735,469 issued February 21, 1956.

The mechanism shown in Patent No. 2,735,469 includes a feeder for conveying field forage through an opening and into a chopper where the material is comminuted and then discharged through a pipe by the action of blower means. The chopper comprises a reel having a plurality of knives operable successively with a stationary knife or shear bar. Each knife is flat; and, it has a straight cutting edge. At one lateral end of the reel, the knives are uniformly tangentially displaced forwardly relative to their respective opposite ends so that all of the knives extend at an angle to the rotational axis of the reel and to the stationary knife. This mounting enables the reel knives to successively cooperate with the stationary knife in such a manner that they exert a shearing action on material moving through the feed passage and between the stationary knife and cutting reel.

The mounting of the reel knives is such that the respective ends of the cutter knives are equidistant from the axis of the reel, whereas the centers or mid-sections of the knives lie somewhat closer to the reel axis. Due to this fact, the rotating cutting edges of the reel knives generate a hyperboloid; and, to obtain a good cutting action, it is necessary that the stationary knife be bowed toward the cutting reel so that its cutting edge closely approximates a hyperbolic curve contiguous to the hyperboloid generated by the reel.

The amount of bowing or curvature required for the stationary knife is obtainable through mathematical calculations. However, heretofore, to provide a knife with such a curvature and at low cost constituted a substantial problem. For example, manufacturing a stationary knife with a desired curvature, while a solution, is not practical because cost is prohibitive. Further, the prior art teaches that a curved shear bar may be provided by carefully machining or casting a knife support with the proper curve and then bolting a straight shear bar to it whereby the bar will be bowed and assume the curvature of the support. While this is less costly than manufacturing a shear bar with a desired curve, it likewise is unsuitable because considerable expense is involved in manufacturing the support.

One object of this invention is to provide, in a cutter mechanism of the character described, a bowed stationary knife which may be manufactured and installed at only a fraction of the cost heretofore required.

Another object of this invention is to provide, in a cutter mechanism of the character described, a stationary knife and a support therefor both of which are manufactured without a bow or curvature, there being provided means for connecting the stationary knife to the support so that the knife is bowed to a desired degree.

Another object of this invention is to provide a stationary knife of the character described which is rectangular in cross section and has four cutting edges.

A further object of this invention is to provide means for mounting a stationary knife of the character described whereby any one of the knife's four cutting edges may be used, selectively, for cooperation with the cutting reel.

A further object of this invention is to provide means for mounting a stationary knife so that the knife is bowed or curved to present a hyperbolic cutting edge of utmost accuracy in relation to a hyperboloid surface generated by a cutting reel.

A still further object of this invention is to provide a stationary knife which rarely requires sharpening since it has four cutting edges which can be utilized successively before the knife has to be re-honed.

A still further object of this invention is to provide stationary knife mounting means of such simplicity that no particular skill is required to mount the knife in a cutter mechanism or to shift the knife around to utilize, successively, its various cutting edges.

Other objects of this invention will be apparent hereinafter from the specification and from the recital in the appended claims.

In the drawings:

Fig. 1 is a fragmentary, generally diagrammatic, side elevation of a portion of a reel type chopping mechanism having a shear bar mounted according to one embodiment of this invention;

Fig. 2 is a side elevation looking from the left of Fig. 1 and showing the shear bar and its support;

Fig. 3 is a section taken on the line 3—3 of Fig. 2 looking in the direction of the arrows and illustrating the means for bowing the shear bar when it is bolted to the support;

Fig. 4 is an enlarged fragmentary section of the shear bar, support and connecting means;

Fig. 5 is a vew similar to Fig. 2 and showing a shear bar and support constructed according to another embodiment of this invention;

Fig. 6 is a section taken on the line 6—6 of Fig. 5 looking in the direction of the arrows;

Figs. 7–9 are sections similar to Fig. 6, but illustrating three other mounting positions of the shear bar; and, Figs. 10–13 are sections taken through the centers of the supports in Figs. 6–9, respectively, and illustrating the ways in which the shear bar may be mounted so that, selectively, the four cutting edges of the shear bar may be employed.

Referring now to the drawings by numerals of reference, and first to the embodiment shown in Figs. 1–4, inclusive, 10 denotes generally a cutter reel of the type shown in U. S. Patent No. 2,735,469. Reel 10 is mounted on a shaft 11 driven from a source of power, not shown. Shaft 11 is journaled for rotation in spaced bearings, one of which 12, is shown. Each bearing is supported on a pedestal 14 mounted on a portion 15 of a frame 16.

Cutter reel 10 includes a pair of relatively spaced, parallel discs 18 having hubs keyed to shaft 11. Extending between discs 18 are a plurality of knife supports 19 having end plates 20 bolted or otherwise secured at 21 to the discs. Each support carries a flat knife 22 beveled along one edge 24 to provide a cutting edge 25. The knives are disposed in a generally tangential plane, and, their cutting edges are presented in the direction of rotation of the reel. The mounting of the knives are such that they generate a hyperboloid. The nature of this mounting is fully disclosed in the above mentioned patent and need not be described more fully here, suffice it to say that for the cutter reel to operate properly, it should have a cooperative stationary knife or shear bar which is bowed toward the reel to closely approximate the hyperbolic curve generated by the reel.

The stationary knife or shear bar, which is denoted 30, extends through openings 16' in relatively spaced side walls of frame 16 and it is carried on a support or bar 31. In Fig. 1 only one end of the stationary knife support structure is shown, it being understood that the opposite end of the knife is similarly supported. At each end, support 31 is connected by bolts 32 and nuts 34 to a bracket 35 welded or otherwise fastened to frame 16. Bolts 32 pass through appropriate holes 37 in support 31. The bracket 35 has an inclined portion 36 which provides a seat for support 31 and insures a proper angular disposition of knife 30 carried thereon relative to the cutter reel 10. Threaded hex thimbles 38 are provided on bolts 32 for use in obtaining proper adjustment of support 31 and knife 30 toward or away from the cutter reel. A lock plate 39 is provided between the heads of bolts 32 to prevent them from turning because of vibrations or other reasons once knife 30 has been adjusted.

Stationary knife 30 is rectangular in shape, regardless of the direction from which it is viewed. It is manufactured flat, having, however, sufficient resiliency to permit it to be bowed; and, it is provided with two selectively usable shearing edges X and X' (Fig. 1). Support 31 is likewise rectangular in shape although preferably of such rigidity that it will not bow. Knife 30 is connected to support 31 by a plurality of bolts 40, the heads 40' (Fig. 4) of which seat in counter-sunk holes in the knife. In this embodiment of the invention, the use of seven bolts is shown. It will be apparent, however, that any desired number may be employed.

Knife 30 is connected to support 31 so that it projects above the support (Fig. 2) for cooperation with the cutter reel knives 22; and, in order that the knife may be bowed outwardly relative to the support, elements in the form of spacer washers 41 (Figs. 3 and 4) are interposed between the knife and the support. There is one washer surrounding each bolt 40 and all of the washers are of the same, uniform, precise, thickness. Each washer seats in a counterbore 42 surrounding its associated bolt 40. Counterbores 42 are of varying depth. The counterbore surrounding central bolt 40a (Fig. 3) is of slight depth. The counterbores surrounding bolts 40b on opposite sides of central bolt 40a are of slightly greater depth. The counterbores surrounding bolts 40c are of even greater depth; and the counterbores around outermost bolts 40d are of the greatest depth. It will thus be seen that the pairs of washers on opposite sides of the central washer project from their seats or counterbores in progressively decreasing amounts so that when knife 30 is bolted down tightly it will be bowed a desired amount around the projecting washers.

With the above mounting, a precise curvature or bowing of knife 30 is obtained; yet, the cost of such mounting is very low. Obviously, the cost is far less than when a support is used having a curved face against which the stationary knife may be bolted so that the knife assumes the curvature of the support. Further, since all the washers used are of the same size, no skill or judgment is required in mounting the knife on the support. One washer is used with each bolt and seats in its proper counterbore. The various depths of the counterbores 42 are easily provided in manufacture.

The same result as described above may be obtained by providing counterbores of uniform depth and then using washers of varying thicknesses. This procedure, however, is not particularly desirable because of the difficulties encountered in telling the washers apart. For example, the thickest of central washer may be only .033 inch greater than the thinnest end washers. If the operator of the machine is installing or replacing the shear bar and gets the washers mixed up, it will be difficult for him to determine which washers go in which counterbores, unless, of course, the washers are marked. But marking each washer obviously is an undesirable added expense.

When knife 30 is mounted as shown in Fig. 1 with shearing edge X positioned to cooperate with the knives 22 on cutter reel 10, and the edge becomes worn, the knife may be turned bottom side so that edge X' is disposed to provide the shearing edge. The series of bolts 40 are disposed in holes on a line mid-way between the longitudinal edges of the knife. Thus, when the knife is turned bottom edge X' up, the projection of the knife above support 31 is the same as when X edge is up.

Since the longitudinal upper and lower faces of knife 30 are flat, the knife may be readily sharpened by running a grinding stone over these faces. This provides two sharp edges along each longitudinal face of the knife or a total of four honed edges. With this in mind, the embodiment of the invention shown in Figs. 5–13 is provided.

In the first embodiment of the invention, blade 30 is countersunk from one side only for the heads of bolts 40. As a result, the side of blade 30 opposite the countersunk side must always face support 31. Thus, only edges X and X' may be used as cutting edges. To countersink the holes in the knife from the opposite side of the bolt holes would remove too much metal and fail to provide sufficient contact between knife 30 and bolts 40 to hold the knife rigidly in place. Therefore, in the embodiment of the invention shown in Figs. 5–13 a second series of bolt holes is provided along with the first series, these second holes being countersunk from the opposite side of blade 30 than the countersinks for the first series of holes. In these figures parts the same as those shown in Figs. 1–4 have the same numerals.

Numeral 50 denotes the knife or shear bar which has a first series of seven bolt holes $a$ and a second series of seven bolt holes $b$ positioned alternately between the holes of the first series of holes. Knife 50 has a first side face 51 and a second side face 52. The first series of holes $a$ are countersunk from side 51. The second series of holes $b$ are countersunk from side 52. Knife 50 has four cutting edges denoted X, $X^1$, $X^2$, and $X^3$. Further, in order that it may be easily understood how knife 50 may be mounted in four different ways, the first hole in the first series of holes $a$ (looking from left to right in Fig. 6) is denoted $a'$ and the last hole $a''$. The first hole of the second series of holes $b$ is denoted $b'$ and the last hole $b''$.

To utilize cutting edge X, knife 50 is mounted as shown in Figs. 5, 6 and 10 with side 52 of the knife facing support 31 and the bolt 40 passing through the first series of holes $a$. The washers 41 are utilized in counterbores 42 in support 31 as previously described to effect a proper curvature of the knife when it is bolted tightly to the support. As shown in Fig. 6, holes $a'$ and $b'$ are to the left and holes $a''$ and $b''$ are to the right.

To use edge X' knife 50 is mounted as shown in Figs. 7 and 11, with holes $b''$ and $a''$ to the left and holes $b'$ and $a'$ to the right. Bolts 40 extend through series of holes $a$ as shown; and, side 52 of knife 50 abuts against support 31.

Edge $X^2$ is utilized to cooperate with cutting reel 10 by mounting knife 50 as shown in Figs. 9 and 13, that is, with side 51 of the knife facing support 31, with edge $X^2$ up (Fig. 13), with bolts 40 passing through series of holes $b$, and with hole $b''$ to the left (Fig. 9).

Finally, edge $X^3$ is disposed for use by mounting knife 50 as shown in Figs. 8–12, with edge $X^3$ up, with bolts 40 passing through series of holes $b$, and with hole $b'$ to the left (Fig. 8).

It is thus seen, that edges X, X', $X^2$ and $X^3$ may be, selectively, used; and whatever the mounting of knife 50 may be, proper curvature of the knife may be obtained, with relation to cutter reel knives 22. Support 31, with its bolt holes and counterbores 42 for washers 41, remains fixed, knife 50 being turned about as desired and then secured to support 31 so that a desired cutting edge is presented to cutter reel 10.

Since all four edges of knife 50 are usable, it need rarely be sharpened; and, when it is sharpened, such operation may be quickly employed since the blade is rectangular in cross-section, having flat surfaces for honing.

While this invention has been described in connection with two different embodiments thereof, it will be understood that it is capable of further modification, and this application is intended to cover any variations, usages, or adaptations of the invention following, in general, the principles of the invention and including such departures from the present disclosure as come within known or customary practice in the art to which the invention pertains and as fall within the scope of the invention or the limits of the appended claims.

Having thus described our invention what we claim is:

1. A stationary knife having a normally straight cutting edge, a flat support for said knife, and means for connecting said knife to said support whereby said knife is bowed outwardly relative to said support, said means comprising a middle pocket in said support, a pair of pockets in said support on opposite sides, respectively, of said middle pocket, and equidistant therefrom, the depth of said pair of pockets being the same and greater than the depth of said middle pocket, three spacer members of identical thickness, one positioned in each of said pockets and projecting outwardly thereof, said knife being adapted to abut against the spacer in said middle pocket, and means for drawing said knife toward said support whereby the knife is brought into engagement with the spacers in said pair of pockets.

2. A stationary knife having a normally straight cutting edge, a flat support for said knife, and means for connecting said knife to said support whereby said knife is bowed outwardly relative to said support, said means comprising a middle pocket in said support, a first pair of pockets in said support on opposite sides, respectively, of said middle pocket, a second pair of pockets in said support on opposite sides, respectively, of said first pair of pockets, the depth of said middle pocket being less than the depth of the other pockets, the depth of said first pair of pockets being less than the depth of said second pair of pockets, a spacer member positioned in each of said pockets and projecting outwardly therefrom, all of said spacer members being of identical thickness, said knife being adapted to abut against the spacer in said middle pocket, and means for drawing said knife toward said support whereby the blade is brought into engagement with the spacers in said first and second pairs of pockets.

3. A stationary knife which is rectangular in cross-section and which has four normally straight cutting edges usable, selectively, in cooperation with a movable knife, a flat support for said knife, a plurality of holes in said knife, a plurality of holes in said support registering with said knife holes, means projectable through said holes for connecting said knife to said support, and means for bowing said knife outwardly relative to said support, said means comprising a counterbore in each of the holes in said support, a spacer-washer mounted in each counterbore and projecting outwardly therefrom, all of the spacer-washers being of identical size but the depth of the counterbores varying so that the spacer-washers project therefrom varying distances, the counterbores being such that when said knife is drawn toward said support, the knife is bowed outwardly relative to the support, said knife being positionable selectively in one of four different positions whereby any one of the four cutting edges of the knife may be used with the movable knife.

4. A stationary knife which is rectangular in cross-section and which has four normally straight cutting edges usable, selectively, in cooperation with a movable knife, a flat support for said knife, a first set of holes in said knife extending from one side of the knife to the other, each of said holes being countersunk from said one side, a second set of holes in said knife extending from said other side of said knife to said one side, each of said second set of holes being countersunk from said other side, a set of holes in said support, said first and second sets of holes in said knife being registerable, selectively, with the holes in said support with their countersunk ends remote from said support, bolts projectable through the holes in said knife registering with said support holes and into said support holes for connecting said knife to said support, said bolts having heads which fit into the hole countersinks, a counterbore in each of the holes in said support, a spacer-washer mounted in each counterbore and projecting outwardly therefrom, all of the spacer-washers being of identical thickness, but the depth of the counterbores varying so that the spacer-washers project therefrom varying distances, the counterbores being such that when said knife is drawn toward said support upon tightening said bolts the knife is bowed outwardly relative to the support, said knife being positionable selectively in one of four different positions whereby any one of the four cutting edges of the knife may be used with the movable knife.

5. A stationary knife having a normally straight cutting edge, a flat support for said knife, a plurality of holes in said knife, a plurality of holes in said support registrable with said knife holes, means projectable through the holes in said knife and into the holes in said support for connecting said knife to said support, and means for bowing said knife relative to said support, said means comprising a counterbore in each of the holes in said support, a spacer mounted in each counterbore and projecting outwardly therefrom, all of the spacers being of identical size but the depth of the counterbores varying so that the spacers project therefrom varying distances, the counterbores being such that when said knife is drawn toward said support the knife is bowed relative to the support, the medial portion of the knife being further from said support than the ends thereof.

6. A knife member having a normally straight cutting edge, a flat support member, and means for connecting the knife to the support whereby the knife is bowed relative to the support and said cutting edge is similarly bowed, a medial portion of the knife being further from the support than the opposite ends of the knife, said means comprising a middle spacer, a pair of spacers on opposite sides of said middle spacers, said spacers being of the same thickness and interposed between the knife and support, a middle pocket in one of said members for holding said middle spacer, a pair of pockets in one of said members and on opposite sides respectively of said middle pocket for holding said pair of spacers, the depth of said middle pocket being less than the depth of said pair of pockets, the depth of all of the pockets being such that the spacers project outwardly therefrom, and fastening means for connecting said opposite end of the knife to the support and for drawing such ends toward said support.

References Cited in the file of this patent

UNITED STATES PATENTS

| | | |
|---|---|---|
| 2,146,946 | Engel | Feb. 14, 1939 |
| 2,399,529 | Willits | Apr. 30, 1946 |
| 2,829,694 | Jarvis | Apr. 8, 1958 |